United States Patent Office 3,163,641
Patented Dec. 29, 1964

3,163,641
16-SUBSTITUTED ANDROSTANES AND ANDROSTENES
Robert G. Christiansen, Schodack, Raymond O. Clinton, East Greenbush, and John W. Dean, Sand Lake, N.Y., assignors to Sterling Drug Inc., New York, N.Y., a corporation of Delaware
No Drawing. Filed Nov. 15, 1962, Ser. No. 238,029
19 Claims. (Cl. 260—239.5)

This invention relates to new steroid compounds of the androstane and androstene series substituted in the 16-position, and to processes for preparing them.

A particular aspect of the invention is concerned with compounds selected from the group consisting of:

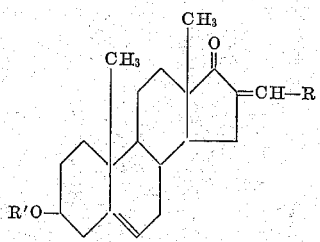

I

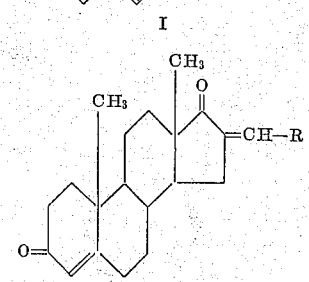

II and

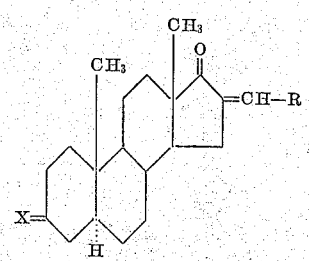

III wherein R is a member of the group consisting of pyridyl, thienyl, furyl, phenylvinyl and phenyl substituted by from one to three substituents selected from halogen (including fluorine, chlorine, bromine or iodine), di-lower-alkylamino, lower-alkoxy and benzyloxy; R' is a member of the group consisting of hydrogen and Acyl; and X is a member of the group consisting of O, (H)(OH) and (H)(OAcyl); Acyl in each instance being a carboxylic acid acyl group having from one to ten carbon atoms and a molecular weight less than 200; and acid-addition and quaternary ammonium salts of basic members thereof.

In the above Formulas I, II and III, R, when pyridyl, thienyl or furyl can have any of the possible orientations, that is, 2-pyridyl, 3-pyridyl, 4-pyridyl, 2-thienyl, 3-thienyl, 2-furyl or 3-furyl. When R stands for phenyl substituted by di-lower-alkylamino or lower-alkoxy, the alkyl moieties can have from one to about four carbon atoms.

When acyloxy radicals are present in the steroid molecule, the acyl radicals are preferably derived from carboxylic acids having from one to about ten carbon atoms, conventionally employed in the steroid art, and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like.

The compounds of Formulas I (R' is H) and III [X is (H)(OH)] are prepared by condensing 5-androsten-3β-ol-17-one or androstan-3β-ol-17-one with the appropriate aldehyde, O=CH-R, in the presence of a strong base. The strong base can be an alkali metal hydroxide, lower-alkoxide, amide or the like, and the reaction takes place in an inert solvent at a temperature between about 50° C. and 150° C.

Compounds of Formula II can be prepared from compounds of Formula I by the Oppenauer oxidation procedure. Compounds of Formula III where X is O can be prepared from the compounds of Formula III when X is (H)(OH) by the Oppenauer procedure or by chromic acid oxidation. The compounds of Formula I where R' is Acyl and of Formula III when X is (H)(OAcyl) can be prepared from the corresponding carbinols by conventional esterification procedures.

Another particular aspect of the invention is concerned with compounds having the formula

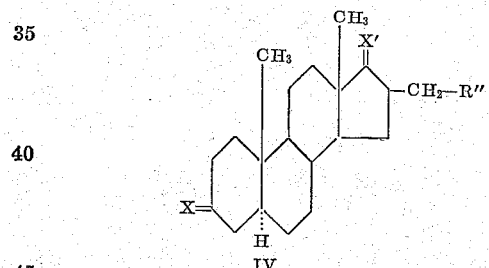

IV where R" is a member of the group consisting of pyridyl, thienyl, furyl, 1-lower-alkylpiperidyl, 4-oxocyclohexyl, 4-oximinocyclohexyl, 4-azacycloheptyl, 4-aza-5-oxocycloheptyl, and phenyl substituted by from one to three substituents selected from halogen (including fluorine, chlorine, bromine and iodine), di-lower-alkylamino and lower-alkoxy; and X and X' are members of the group consisting of O, (H)(OH) and (H)(OAcyl), Acyl being a carboxylic acyl group having from one to ten carbon atoms and a molecular weight less than about 200; and acid-addition and quaternary ammonium salts of basic members thereof.

In the above Formula IV, R", when pyridyl, thienyl, furyl or 1-lower alkylpiperidyl can have any of the possible orientations, that is, 2-pyridyl, 3-pyridyl, 4-pyridyl, 2-thienyl, 3-thienyl, 2-furyl, 3-furyl, 1-lower-alkyl-2-piperidyl, 1-lower-alkyl-3-piperidyl, or 1-lower-alkyl-4-piperidyl. When R" stands for 1-lower alkylpiperidyl, or phenyl substituted by di-lower-alkylamino or lower-alkoxy, the alkyl moieties can have from one to about four carbon atoms.

When X and X' in Formula IV represent (H)(OAcyl), the Acyl has the same meaning given hereinabove for compounds of Formulas I, II and III.

The compounds of Formula IV where R" is pyridyl, thienyl, furyl, or phenyl substituted by halogen, di-lower-alkylamino or lower-alkoxy are prepared by catalytically reducing compounds of Formula III. A preferred procedure comprises catalytic hydrogenation at moderate pressure in the presence of a palladium catalyst supported on strontium carbonate. In some instances the 17-oxo group is also reduced to a 17β-hydroxy group [X′=(H)(OH)].

The compounds of Formula IV where R″ is 1-loweralkylpiperidyl are prepared by catalytic reduction of lower-alkyl quaternary ammonium salts of compounds of Formula IV where R″ is pyridyl.

The compounds of Formula IV where R″ is 4-oxocyclohexyl, 4-oximinocyclohexyl, 4-aza-5-oxocycloheptyl or 4-azacycloheptyl are prepared by a sequence of transformations as depicted by the following flow sheet using partial formulas showing Ring D of the steroid moiety only:

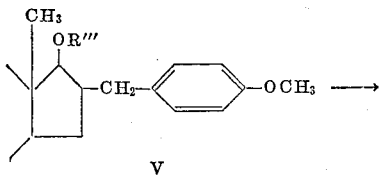

V

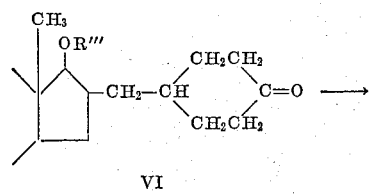

VI

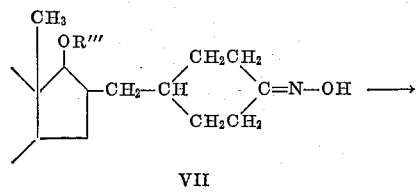

VII

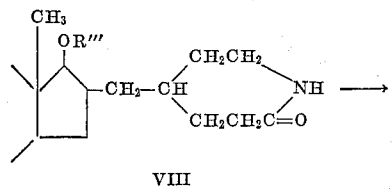

VIII

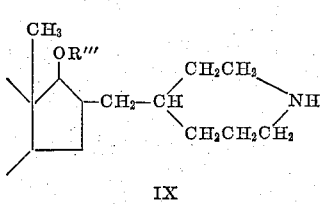

IX

In the foregoing formulas, R‴ stands for hydrogen or Acyl as defined hereinabove. The compounds where R‴ is hydrogen can be esterified, or oxidized to an oxo group, by conventional procedures at different stages in the synthesis.

The 16β-p-methoxybenzyl compound (V) is subjected to a reduction using lithium in liquid ammonia. The resulting intermediate enol ether need not be isolated but is hydrolyzed with oxalic acid and catalytically reduced to give the 16β-(4-oxocyclohexylmethyl) compound (VI). The latter is converted to its oxime (VII) by heating it with hydroxylamine hydrochloride in pyridine and ethanol. Beckmann rearrangement of the oxime (VII) to the 16β-(4-aza-5-oxocycloheptylmethyl) compound (VIII) is effected by treating the former with thionyl chloride in dioxane. The final step comprises reduction of the lactam (VIII) to the 16β-(4-azacycloheptylmethyl) compound (IX) with lithium aluminum hydride in tetrahydrofuran.

Those compounds of the invention which are basic in nature, that is, those of Formulas I–IV wherein R (or R″) is pyridyl, 1-lower-alkylpiperidyl, or phenyl substituted by di-lower-alkylamino, and of Formula IX, readily form acid-addition salts upon addition of strong acids; and the tertiary amines of Formulas I–IV, wherein R (or R″) is pyridyl, 1-lower-alklylpiperidyl, or phenyl substituted by di-lower-alkylamino, readily form quaternary ammonium salts upon addition of esters of strong acids.

The quaternary ammonium salts are prepared by causing the tertiary amine to react with an ester of a strong inorganic or organic sulfonic acid, said ester preferably having a molecular weight less than about 200. A particularly preferred class of esters, because of their ready availability, are lower-alkyl, lower-alkenyl and monocarbocyclic aryl-lower-alkyl esters, for example, methyl iodide, ethyl iodide, ethyl bromide, propyl bromide, butyl bromide, allyl bromide, methyl sulfate, methyl benzenesulfonate, methyl p-toluenesulfonate, benzyl chloride, o-chlorobenzyl chloride, and the like. The reaction of the tertiary amine and the quaternizing agent takes place upon simple admixture of the components, preferably in the presence of an inert organic solvent, although heating may be applied to accelerate the reaction.

The acid-addition and quaternary ammonium salts preferably have anions which are pharmacologically acceptable, that is, the anions do not appreciably increase the toxicity of the compound as a whole toward animal organisms. Such anions include, for example, the chloride, bromide, iodide, sulfate or acid sulfate, methanesulfonate, benzenesulfonate, and the like. Salts having toxic anions are, however, useful in that they serve as characterizing derivatives of the basic steroids and serve as intermediates for non-toxic quaternary salts by conventional ion exchange reactions. All acid-addition salts, regardless of the nature of the anions, are useful as intermediates in the purification of the free bases.

Endocrinological and pharmacological studies of the compounds of the invention have shown that they possess useful metabolic, hormonal, anti-hormonal or cardiovascular properties. In particular, they exhibit one or more of the following activities: anabolic, androgenic, pituitary inhibiting, coronary dilator and antihypertensive.

The compounds of the invention can be prepared for use by dispersing them in an aqueous suspension or by dissolving them in a pharmacologically acceptable oil or oil-water emulsion for parenteral administration; or by incorporation in tablet form with excipients for oral administration.

The structures of the compounds of the invention were established by the modes of synthesis, by ultraviolet and infrared spectral analysis, and by the fact that the values found upon elementary analysis corresponded to the values calculated for the assigned structures. The compounds of Formulas IV–IX were assigned the 16β-configuration from the fact that catalytic reduction of 16-exo double bonds is known to produce substituents having that orientation.

The following examples will further illustrate the invention without the latter being limited thereby.

*16-arylidene derivatives (I and III) of 5-androsten-3β-ol-17-one and of androstan-3β-ol-17-one.*—These compounds were prepared by allowing the steroidal ketone to react with a moderate excess (25–75%) of the appropriate aldehyde plus an equivalent quantity of potassium hydroxide, all in solution in refluxing methanol. Often the condensation product crystallized directly from the reaction solution after a short period at reflux; when it did not, heating was discontinued after an hour and the solution was concentrated by distillation at reduced pressure. If the latter procedure did not induce crystallization of the product, the reaction solution was diluted with water and the crude product thus precipitated was collected by filtration. Recrystallization from appropriate solvents (see Tables 1 and 2) afforded the pure compounds, for which the data recorded in the tables were determined.

5-androsten-3β-ol-17-one, 16-(3-furylmethylene)-5-androsten-3β-ol-17-one, 16-(4-fluorobenzylidene)-5-androsten-3β-ol-17-one, 16-(4-bromobenzylidene)-5-androsten-3β-ol-17-one, 16-(4-iodobenzylidene)-5-androsten-3β-ol-17-one,

TABLE 1
16-Arylidene Derivatives (I) of 5-Androsten-3β-ol-17-One

| Example | 16-Arylidene Substituent (yield) | M.P. (corr.) (recrystallization solvent) | Rotation $[\alpha]_D^{25}$ (1% in $CHCl_3$) | Ultraviolet Spectrum $\lambda_{max}$. (ε) |
|---|---|---|---|---|
| 1 | 2,4-Dichlorobenzylidene (83.0%) | 200.8–204.6° (ethyl acetate) | −10.2° | 232 mμ (11,200); 294 mμ (21,900). |
| 2 | 2-Pyridylmethylene (81.6%) | 200.0–203.8° (acetone) | −126.0° | 263 mμ (12,200); 272 mμ (12,900); 298 mμ (20,000). |
| 3 | 4-Methoxybenzylidene (92.6%) | 222.0–226.2° (acetone) | −15.6° | 236 mμ (8,400); 323 mμ (28,100). |
| 4 | 4-Dimethylaminobenzylidene (58.7%) | 279.8–284.0° (chloroformethanol) | +14.1° | 251 mμ (9,600); 328 mμ (6,700); 385 mμ (31,400). |
| 5 | Cinnamylidene (75.7%) | 207.6–211.2° (ethanolmethanol) | −198.2° | 235 mμ (6,100); 333 mμ (40,100). |
| 6 | 2-Methoxybenzylidene (87.3%) | 129.2–135.2° (acetone) | +31.6° | 234 mμ (7,300); 289 mμ (13,500); 331 mμ (11,800). |
| 7 | 4-Chlorobenzylidene (69.5%) | 219.4–222.2° (tetrahydrofuran) | −32.2° | 225 mμ (8,100); 231 mμ (7,300); 299 mμ (23,600). |
| 8 | 3,4,5-Trimethoxybenzylidene (78.8%) | 132.8–136.2° (benzene-n-hexane) | −17.3° | 242 mμ (11,300); 322 mμ (21,500). |
| 9 | 4-Pyridylmethylene (86.5%) | 261.2–265.4° (ethylacetate) | −51.0° | 280 mμ (23,500). |

16 - (2,4 - dichlorobenzylidene)-5-androsten-3β-ol-17-one (Example 1), 16-(4-methoxybenzylidene) - 5 - androsten-3β-ol-17-one (Example 3) and 16-(4-dimethylaminobenzylidene)-5-androsten-3β-ol-17 - one (Example 4) were found to cause a significant drop in blood pressure when administered orally to renal hypertensive rats at a dose level of 50 mg./kg.

16 - (2,4 - dichlorobenzylidene)-5-androsten-3β-ol-17-one (Example 1) was found to cause pituitary and uterine hypertrophy in mature female rats at a dose level of 20 mg./kg. per day.

16 - (2 - pyridylmethylene)-5-androsten-3β-ol-17-one (Example 2) was found to have a coronary dilator activity 200% that of papaverine when injected into the isolated rabbit heart at a dose level of 0.025 mg. per heart. 16-(4-pyridylmethylene) - 5 - androsten-3β-ol-17-one (Example 9) similarly had a coronary dilator activity 125% that of papaverine.

16-cinnamylidene-5-androsten-3β-ol-17-one (Example 5) was found to cause inhibition of pituitary gonadotrophic function when administered subcutaneously to male rats, whereas 16-(2-methoxybenzylidene)-5-androsten-3β-ol-17-one (Example 6) was found to be androgenic.

By causing 5-androsten-3β-ol-17-one to react with 2-thiophenecarboxaldehyde, 3-thiophenecarboxaldehyde, 2-furancarboxaldehyde, 3-furancarboxaldehyde, 4-fluorobenzaldehyde, 4-bromobenzaldehyde, 4-iodobenzaldehyde, 2,4,6-trichlorobenzaldehyde, or 3-chloro-4-methoxybenzaldehyde, there can be obtained, respectively, 16-(2-thienylmethylene)-5-androsten-3β-ol-17-one, 16-(3-thienylmethylene)-5-androsten-3β-ol-17-one, 16-(2-furylmethylene)-5-androsten-3β-ol-17-one, 16-(3-furylmethylene)-5-androsten-3β-ol-17-one, 16-(4-fluorobenzylidene)-5-androsten-3β-ol-17-one, 16-(4-bromobenzylidene)-5-androsten-3β-ol-17-one, 16-(4-iodobenzylidene)-5-androsten-3β-ol-17-one, 16-(2,4,6-trichlorobenzylidene) - 5 - androsten-3β-ol-17-one, or 16-(3-chloro-4-methoxybenzylidene)-5-androsten-3β-ol-17-one.

16-(4-methoxybenzylidene) - 5 - androsten-3β-ol-17-one can be caused to react with acetic anhydride, propionic anhydride, caproyl chloride, succinic anhydride, β-cyclopentylpropionyl chloride, benzoyl chloride, p-nitrobenzoyl chloride, 3,4,5-trimethoxybenzoyl chloride, phenylacetyl chloride, or cinnamoyl chloride, by heating in the presence of pyridine, to give, respectively, 3β-acetoxy-16-(4-methoxybenzylidene)-5-androsten-17-one, 3β - propionoxy-16-(4-methoxybenzylidene)-5-androsten-17-one, 3β-caproyloxy-16-(4 - methoxybenzylidene)-5-androsten-17-one, 3β-(β-carboxypropionoxy) - 16 - (4 - methoxybenzylidene)-5-androsten-17-one, 3β-(β-cyclopentylpropionoxy)-16-(4-methoxybenzylidene)-5-androsten-17-one, 3β-benzoyloxy-16-(4-methoxybenzylidene) - 5 - androsten-17-one, 3β-(p-nitrobenzoyloxy) - 16 - (4-methoxybenzylidene)-5-androsten-17-one, 3β-(3,4,5-trimethoxybenzoyloxy)-16-(4-methoxybenzylidene)-5-androsten-17-one, 3β - phenylacetoxy-16-(4-methoxybenzylidene)-5-androsten-17-one, or 3β-cinnamoyloxy-16-(4 - methoxybenzylidene)-5-androsten-17-one.

16-(4-dimethylaminobenzylidene - 5 - androsten-3β-ol-17-one can be caused to react with hydrochloric acid, hydrobromic acid, sulfuric acid, phosphoric acid, lactic acid, tartaric acid, citric acid, quinic acid, benzenesulfonic acid, ethanesulfonic acid, methyl chloride, methyl bromide, methyl iodide, ethyl bromide, butyl bromide, allyl bromide, benzyl bromide, o-chlorobenzyl chloride, or 2-phenylethyl bromide, to give, respectively, the hydrochloride, hydrobromide, sulfate (or bisulfate), phosphate (or

TABLE 2
16-Arylidene Derivatives (III) of Androstan-3β-Ol-17-One

| Example | 16-Arylidene Substituent (yield) | M.P. (corr.) (recrystallization solvent) | Rotation $[\alpha]_D^{25}$ (1% in $CHCl_3$) | Ultraviolet Spectrum $\lambda_{max}$. (ε) |
|---|---|---|---|---|
| 10 | 4-Methoxybenzylidene (85.0%) | 218.4–220.6° (methanol) | +45.0° | 234 mμ (8,700); 323 mμ (28,100). |
| 11 | 2-Pyridylmethylene (96.0%) | 180.4–182.4° (acetonitrile) | −57.6° | 264 mμ (12,300); 272 mμ (13,000); 299 mμ (20,000). |
| 12 | 4-Pyridylmethylene (93.0%) | 233.8–237.0° (ethyl acetate) | +10.5° | 280 mμ (24,300). |
| 13 | 4-Dimethylaminobenzylidene (73.5%) | 250.4–255.8° (methanol) | +59.7° | 252 mμ (9,200); 382 mμ (32,700). |
| 14 | 4-Benzyloxybenzylidene (94.5%) | 207.8–209.4° (ethyl acetate) | +35.6° | 233 mμ (9,200); 323 mμ (31,400). | acid phosphate), lactate, tartrate (or bitartrate), citrate (or acid citrate), quinate, benzenesulfonate, methochloride, methobromide, methiodide, ethobromide, butobromide, allobromide, benzobromide, o-chlorobenzochloride, or 2-phenylethobromide salts of 16-(4-dimethylaminobenzylidene)-5-androsten-3β-ol-17-one.

16 - (2-pyridylmethylene)androstan-3β-ol-17-one (Example 11) and 16 - (4-pyridylmethylene)androstan-3β-ol-17-one (Example 12) were found to have coronary dilator activities 178% and 224%, respectively, that of papaverine when injected into the isolated rabbit heart at a dose level of 0.025 mg. per heart.

By causing androstan-3β-ol-17-one to react with 2-thiophenecarboxaldehyde, 3 - thiophenecarboxaldehyde, 2-furancarboxaldehyde, 3-furancarboxaldehyde, 4-fluorobenzaldehyde, 4-bromobenzaldehyde, 4 - iodobenzaldehyde, 2,4,6-trichlorobenzaldehyde, or 3-chloro-4-methoxybenzaldehyde, there can be obtained, respectively, 16-(2-thienylmethylene)androstan-3β-ol - 17 - one, 16 - (3-thienylmethylene)androstan-3β-ol-17-one,
16-(2-furylmethylene)androstan-3β-ol-17-one,
16-(3-furylmethylene)androstan-3β-ol-17-one,
16-(4-fluorobenzylidene)androstan-3β-ol-17-one,
16-(4-bromobenzylidene)androstan-3β-ol-17-one,
16-(4-iodobenzylidene)androstan-3β-ol-17-one,
16 - (2,4,6 - trichlorobenzylidene)androstan-3β-ol-17-one, or 16 - (3-chloro-4-methoxybenzylidene)androstan-3β-ol-17-one.

16-(4-methoxybenzylidene)androstan-3β-ol-17-one can be caused to react with acetic anhydride, propionic anhydride, caproyl chloride, succinic anhydride, β-cyclopentylpropionyl chloride, benzoyl chloride, p-nitrobenzoyl chloride, 3,4,5-trimethoxybenzoyl chloride, phenylacetyl chloride, or cinnamoyl chloride, by heating in the presence of pyridine, to give, respectively, 3β-acetoxy-16-(4-methoxybenzylidene)androstan-17-one, 3β - propionoxy-16-(4-methoxybenzylidene)adrostan-17-one, 3β - caproyloxy-16-(4-methoxybenzylidene)androstan - 17 - one, 3β-carboxypropionoxy)-16-(4 - methoxybenzylidene)androstan - 17-one, 3β-(β-cyclopentylpropionoxy)-16-(4-methoxybenzylidene)androstan-17-one, 3β - benzoyloxy-16-(4 - methoxybenzylidene)androstan-17-one, 3β - (p-nitrobenzoyloxy) 16 - (4-methoxybenzylidene)androstan-17-one, 3β - 3,4,5-trimethoxybenzoyloxy)-16-(4 - methoxybenzylidene)androstan-17-one, 3β-phenylacetoxy-16-(4 - methoxybenzylidene)androstan - 17 - one. or 3β - cinnamoyloxy - 16 - (4-methoxybenzylidene)androstan-17-one.

16 - (4 - dimethylaminobenzylidene)androstan-3β-ol-17-one can be caused to react with hydrochloric acid, hydrobromic acid, sulfuric acid, phosphoric acid, lactic acid, tartaric acid, citric acid, quinic acid, benzenesulfonic acid, ethanesulfonic acid, methyl chloride, methyl bromide, methyl iodide, ethyl bromide, butyl bromide, allyl bromide, benzyl bromide, o-chlorobenzyl chloride, or 2-phenylethyl bromide, to give, respectively, the hydrochloride, hydrobromide, sulfate (or bisulfate), phosphate (or acid phosphate), lactate, tartrate (or bitartrate), citrate (or acid citrate), quinate, benzenesulfonate, methochloride, methobromide, methiodide, ethobromide, butobromide, allobromide, benzobromide, o-chlorobenzochloride, or 2-phenylethobromide salts of 16-(4-dimethylaminobenzylidene)androstan-3β-ol-17-one.

16 - (2,4 - dichlorobenzylidene)androstan-3β-ol-17-one can be prepared from androstan-3β-ol-17-one and 2,4 - dichlorobenzaldehyde by the general procedure described hereinabove.

EXAMPLE 15

16-(4-Hydroxybenzylidene)-2-Androsten-17-One

A mixture of 16 - (4 - methoxybenzylidene)androstan-3β-ol-17-one (Example 10) (20.0 g.) and freshly-prepared pyridine hydrochloride (20.0 g.) was heated to 210° C. under a dry nitrogen atmosphere and held at 210° C. for an hour. On cooling to room temperature solidification occurred, the solid was dissolved in 50 ml. of warm ethanol, and the solution diluted with 2 liters of cold water. The crude precipitated product was collected by filtration and was washed well with water. Trituration of the damp filter cake with 125 ml. of 2 N sodium hydroxide resulted in a deep yellow solution which was filtered to free it of a small amount of insoluble material. The filtrate was diluted with an equal volume of water and then made acidic by the addition of dilute hydrochloric acid. The reprecipitated phenolic product was again collected and washed with water. Recrystallization from aqueous acetonitrile gave 11.05 g. of 16-(4-hydroxybenzylidene)-2-androsten-17-one, M.P. 226–242° C., amounting to a 61.5% yield. A sample, prepared by recrystallization from methanol, had M.P. 250.4–255.8° C. (corr.); $[\alpha]_D^{25} = +122.5°$. Ultraviolet spectrum: $\lambda_{max}$ 236 mμ (ε8,300) and $\lambda_{max}$ 328 mμ (ε28,000). In the infrared, a strong hydroxyl band appeared at 3.04μ and carbonyl absorption at 5.92μ. A small unresolved plateau was observed in the region 6.03μ to 6.11μ, due to the isolated double bond in the A ring.

*Acetate derivative.*—A solution of 2.0 g. (5.3 mmoles) of 16 - (4-hydroxybenzylidene)-2-androsten-17-one in 10 ml. of pyridine and 5 ml. of acetic anhydride was heated to 100° C. for 30 minutes and then poured into 900 ml. of cold water. The crude product was obtained in quantitative yield, M.P. 204–208° C. One recrystallization from ethyl acetate afforded 16-(4-acetoxybenzylidene)-2-androsten-17-one, M.P. 205–207.5° C., $[\alpha]_D^{25} = +88.9°$. In the ultraviolet, absorption was: $\lambda_{max}$ 224 mμ (ε8,800) and $\lambda_{max}$ 298 mμ (ε25,800). In the infrared, bands characteristic of phenyl acetates were observed at 5.67μ and 8.35μ and the $C_{17}$ carbonyl absorption appeared at 5.84μ.

EXAMPLE 16

16-(4-Methoxybenzylidene)-5-Androsten-3β-Ol-17-One Hemisuccinate

A solution of 16-(4-methoxybenzylidene)-5-androsten-3β-ol-17-one (Example 3) (12.2 g.) and succinic anhydride (6.0 g.) in 125 ml. of pyridine was heated under reflux for three hours. After it had cooled to room temperature the solution was poured into 2 liters of cold water. After being collected and dried, the crude hemisuccinate was recrystallized five times from acetone to provide 6.75 g. of 16-(4-methoxybenzylidine)-5-androsten-3β-ol-17-one hemisuccinate having the M.P. 208.6–210.0° C. (corr.), $[\alpha]_D^{25} = -42.3°$. The infrared and ultraviolet spectra were in accord with the structure.

The di(hydroxyethyl)ammonium salt of 16-(4-methoxy-benzylidene)-5-androsten-3β-ol-17-one hemisuccinate had the M.P. 142.8–148.8° C. (corr.), $[\alpha]_D^{25} = -44.4°$ when recrystallized from acetone.

EXAMPLE 17

16-(4-Methoxybenzylidene)Androstane-3,17-Dione

Cyclohexanone (40 g.) and 16-(4-methoxybenzylidene)androstan-3β-ol-17-one (Example 10) (20.75 g.) were dissolved in 400 ml. of toluene. The solution was stirred mechanically and heated to boiling, then 50 ml. of the solvent was distilled out to ensure dryness. A solution of 10.4 g. of aluminum isopropoxide was added as a solution in 100 ml. of toluene. The reaction mixture was stirred and heated under reflux for two hours and then cooled to room temperature. Dilute sulfuric acid (100) ml. of 5%) was added, followed by 100 ml. of water. After the mixture had been stirred vigorously for a few minutes, the layers were separated and the organic phase was washed with three 100 ml. portions of water. Steam distillation of the toluene solution for two hours effected removal of cyclohexylidene cyclohexanone and afforded a solid residue of crude diketone. Recrystallization from ethyl acetate gave three crops of crystals totalling 15.88 g., melting in the range 253–272° C. Several additional recrystallizations from benzene gave 16-

(4 - methoxybenzylidene)androstane - 3,17 - dione, M.P. 266.0–278.2° C. (corr.), $[\alpha]_D^{25}=+21.9°$. In the infrared, very strong absorption was evident at $5.85\mu$, resulting from overlapping absorption of the two carbonyl functions.

EXAMPLE 18

16-(4-methoxybenzylidene)-4-androstene - 3,17 - dione was prepared from 20.3 g. of 16-(4-methoxybenzylidene)-androst-5-en-3β-ol-17-one (Example 3) and 49 g. of cyclohexanone in 400 ml. of toluene according to the procedure described above in Example 17. There was thus obtained 16.2 g. of 16-(4-methoxybenzylidene)-4-androstene-3,17-dione, M.P. 244–249° C. (uncorr.). Recrystallization from ethyl acetate yielded a sample which had M.P. 244.2–249.4° C. (corr.), $[\alpha]_D^{25}=-54.4°$. The infrared spectrum showed two carbonyl bands, at $5.86\mu$ and $6.01\mu$. Ultraviolet spectrum: $\lambda_{max}$ 239 m$\mu$ ($\epsilon$ 24,200) and $\lambda_{max}$ 323 m$\mu$ ($\epsilon$ 28,400).

16-(4-methoxybenzylidene)-4-androstene - 3,17 - dione caused a decrease in uterine weight when administered to mature female rats at a dose level of 20 mg./kg. per day.

16-(4-methoxybenzylidene)-4-androstene - 3,17 - caused a reduction of 30 mm. Hg in blood pressure when administered orally to renal hypertensive rats at a dose level of 100 mg./kg.

EXAMPLE 19

*16-(4-Pyridylmethylene)Androstane-3,17-Dione*

A solution of 13.0 g. of chromium trioxide in 50 ml. of glacial acetic acid and 50 ml. of water was added during five minutes to a stirred and cooled solution of 25.0 g. of 16 - (4-pyridylmethylene)androstan-3β-ol-17-one (Example 12) in 300 ml. of glacial acetic acid. After the addition, the dark solution was stirred at room temperature for four hours. Methanol (25 ml.) was added, and the solution was poured into two liters of cold water. The dark-colored aqueous mixture was made basic by the addition of excess 35% sodium hydroxide solution, causing precipitation of the product as a gum which hardened on standing overnight. The crude product was collected and recrystallized from a mixture of acetone and n-hexane to give two crops of crystals: 16.46 g., M.P. 174–176.5° C. (uncorr.) and 2.95 g., M.P. 170–174° C. (uncorr.).

Two additional recrystallizations from the same solvent afforded a sample of 16-(4-pyridylmethylene)androstane-3,17-dione which melted at 176–177° C. (uncorr.), then resolidified and remelted at 196–197° C. (uncorr.). "Seeding" experiments substantiated the supposition that this was a simple case of polymorphism. The rotation was $[\alpha]_D^{25}=+8.8°$. The ultraviolet spectrum was identical with that of the starting material, and the infrared spectrum showed the disappearance of hydroxyl absorption and the appearance of a second carbonyl band at $5.85\mu$.

EXAMPLE 20

*(a) 16β-(2-Pyridylmethyl)Androstan-3β-ol-17-one*

A solution of 20.0 g. of 16-(2-pyridylmethylene)-androstan-3β-ol-17-one (Example 11) in 600 ml. of 95% ethanol was hydrogenated in the presence of 1.0 g. of palladium hydroxide (30%, on strontium carbonate). One molar equivalent of hydrogen was absorbed within 20 minutes, after which the catalyst was removed by filtration and the filtrate evaporated to dryness under reduced pressure. Recrystallization of the crude solid residue from ethyl acetate afforded 15.85 g. of product melting in the range 167–177° C. (uncorr.). Chromatographic purification on silica was necessary to separate the product from 4–5% of starting material which was detected by its ultraviolet absorption at 298 m$\mu$. Elution of the chromatogram with 5% acetone in ether, followed by recrystallization from acetone gave 16β-(2-pyridylmethyl)androstan-3β - ol - 17-one, M.P. 179.8–181.6° C. (corr.), $[\alpha]_D^{25}=+123°$. The compound absorbed in the ultraviolet at $\lambda_{max}$ 258 m$\mu$ ($\epsilon$ 3,400), $\lambda_{max}$ 262 m$\mu$ ($\epsilon$ 3,900) and $\lambda_{max}$ 269 m$\mu$ ($\epsilon$ 2,900).

16β-(2 - pyridylmethyl)androstan - 3β-ol-17-one was found to have a coronary dilator activity 77% that of papaverine when injected into the isolated rabbit heart at a dose level of 0.025 mg. per heart.

*(b) 16β-(2-Pyridylmethyl)Androstan-3β-ol-17-one Methobromide*

A solution of 24.7 g. of 16β-(2-pyridylmethyl) androstan-3β-ol-17-one and 8.5 g. of methyl bromide in 400 ml. of benzene and 350 ml. of acetonitrile was heated to 100° C. for two hours in a stainless steel autoclave. After cooling to room temperature, the reaction mixture was distilled to dryness under reduced pressure. The residual solid was triturated with 750 ml. of boiling water plus several grams of activated carbon and filtered. Three crops of colorless crystals were obtained by successive concentration and cooling of the aqueous filtrate. The combined product totalled 25.36 g., M.P. 249–254° C.(dec.) (uncorr.). Successive recrystallizations from water, ethanol and acetonitrile containing 5% of water gave pure 16β-(2-pyridylmethyl)androstan-3β-ol-17-one methobromide, M.P. 248.0–250.2° C. (corr.), $[\alpha]_D^{25}=+83.6°$ (1% in water). The ultraviolet spectrum showed a single unresolved peak: $\lambda_{max}$ 270 m$\mu$ ($\epsilon$ 7.000). In the infrared a broad strong band appeared at $2.86\mu$–$3.10\mu$, and carbonyl absorption at $5.74\mu$.

16-(2-thienylmethylene)androstan-3β-ol-17-one, 16-(2-furylmethylene)androstan-3β-ol-17-one, 16-(2,4-dichlorobenzylidene)androstan-3β-ol-17-one, and 16-(4-dimethylaminobenzylidene)androstan-3β-ol-17-one can be similarly hydrogenated to give, respectively, 16β-(2-thienylmethyl)androstan - 3β-ol-17-one, 16β-(2-furylmethyl)androstan-3β-ol-17-one, 16β-(2,4-dichlorobenzyl)androstan-3β-ol-17-one, and 16β-(4-dimethylaminobenzyl)androstan-3β-ol-17-one.

EXAMPLE 21

16β-(4-pyridylmethyl)androstan-3β-ol-17-one was prepared by hydrogenation of 10.0 g. of 16-(4-pyridylmethylene)androstan-3β-ol-17-one (Example 12) in 300 ml. of ethyl acetate in the presence of 1.5 g. of 30% palladium hydroxide on strontium carbonate, according to the procedure described above in Example 20. The product was recrystallized from ethyl acetate to give 16β-(4-pyridylmethyl)androstan-3β-ol-17-one, M.P. 205.4–206.6° C. (corr.), $[\alpha]_D^{25}=+111.80$. In the infrared, the saturated 17-keto carbonyl band appeared at $5.76\mu$. In the ultraviolet region, the characteristic 4-substituted pyridine absorption at 252, 257 and 264 m$\mu$ appeared.

16β-(4-pyridylmethyl)androstan - 3β-ol-17-one caused reversal of diethylstilbestrol dipropionate effect on pituitary and adrenal weights in male rats at a dose level of 20 mg./kg. per day.

EXAMPLE 22

*3β-Acetoxy-16β-(4-Methoxybenzyl)Androstan-17-one*

A solution of 13.9 g. of 16-(4-methoxybenzylidene)-androstan-3β-ol-17-one (Example 10) in 15 ml. of acetic anhydride and 40 ml. of pyridine was left at room temperature for 24 hours. Dilution with 600 ml. of cold water afforded, after filtration and drying, a quantitative yield of 3β-acetoxy-16-(4-methoxybenzylidene)androstan-17-one, 15.4 g., M.P. 192.5–193° C. (uncorr.).

A solution of 10.0 g. of the forementioned acetate in 300 ml. of ethyl acetate was hydrogenated with the aid of 2.0 g. of palladium hydroxide catalyst (2% on strontium carbonate) at room temperature under a pressure of 4 atmospheres of hydrogen.

Repeated recrystallization from 95% ethanol provided 3β-acetoxy - 16β-(4-methoxybenzyl)androstan - 17-one, M.P. 177.6–180.2° C. (corr.), $[\alpha]_D^{25}=+91.4°$. The ultraviolet and infrared spectra were consistent with the postulated structure; in the infrared a very strong $5.76\mu$ carbonyl band resulted from superimposition of acetate upon C–17 carbonyl absorption.

EXAMPLE 23

*3β-Acetoxy-16β-(4-Methoxybenzyl)Androstan-17-β-ol*

A solution of 16.1 g. of 3β-acetoxy-16β-(4-methoxybenzyl)androstan-17-one in 1000 ml. of methanol and 500 ml. of tetrahydrofuran was stirred and cooled to 3° C. by means of an ice bath. Sodium borohydride (3.0 g.) dissolved in 30 ml. of cold water was then added, after which the ice bath was removed and the solution was allowed to come to room temperature. After being stirred for an hour, the solution was acidified by the addition of 15 ml. of glacial acetic acid. The solution was distilled under reduced pressure until crystallization of the product began, after which it was cooled in ice. The product was collected by filtration, washed with cold methanol, and dried, giving 14.45 g., M.P. 160.5–162° C. A second crop from the filtrate weighed 0.95 g. and had M.P. 153–158° C. Two recrystallizations from methanol afforded 3β-acetoxy-16β - (4-methoxybenzyl)androstan-17-β-ol, M.P. 162.2–163.6° C. (corr.), $[\alpha]_D^{25}=+27.9°$. The ultraviolet spectrum was identical with that of the starting acetoxy ketone, and in the infrared there was hydroxyl absorption at 2.86μ.

EXAMPLE 24

*(a) 16β-(4-Methoxybenzyl)Androstane-3β,17β-Diol*

To a solution of 40.0 g. of 16-(4-methoxybenzylidene)androstan-3β-ol-17-one (Example 10) in 600 ml. of tetrahydrofuran was added 4.0 g. of a catalyst composed of palladium hydroxide (30%) distributed on strontium carbonate. The mixture was agitated under four atmospheres of hydrogen pressure until absorption of gas had ceased. Since 1.65 molar equivalents of hydrogen had been taken up, it appeared that some reduction of the carbonyl group at C–17 had occurred. A solution of the crude hydrogenation product in one liter of methanol was stirred and cooled to 1° C. by means of an ice bath. A solution of 7.6 g. (200 mmoles) of sodium borohydride in 75 ml. of cold water was added as a slow stream over a period of three minutes, during which time the temperature of the reaction mixture rose to 9° C. and then began to subside. The solution was then allowed to come to room temperature and was stirred for an hour. Acidification was accomplished by the cautious addition of 25 ml. of glacial acetic acid, after which the clear solution was concentrated to a volume of 500 ml. of distillation under reduced pressure. Cooling in ice gave colorless crystals which were collected by suction filtration and washed with cold methanol. After being dried, the product weighed 35.4 g., and melted at 90–100° C. with gas evolution. Dilution of the filtrate and washings with 2.5 liters of cold water afforded 5.15 g. additional solid, M.P. 110–115° C. A portion of the product was recrystallized from methanol; after four recrystallizations there was obtained a sharply melting compound (M.P. 139.5–140° C.) which however was still apparently solvated, judging by its behavior on melting. Only after prolonged drying over $P_2O_5$ at 100° C. and 1 mm. pressure was an apparently solvent-free sample of 16β-(4-methoxybenzyl)androstane-3β,17β-diol obtained, which had M.P. 133.0–143.0° C. (corr.), $[\alpha]_D^{25}=+46.6°$. In the infrared there appeared a strong hydroxyl band at 2.94μ, plus aromatic absorption at 6.21μ, 6.31μ, and 6.61μ. The ultraviolet spectrum was characteristic of 4-alkyl anisoles: $\lambda_{max}$ 278 mμ (ε 1,800), $\lambda_{max}$ 285 mμ (ε 1,500) and $\lambda_{max}$ 224 mμ (ε 10,500).

*(b) 16 -(4-Methoxybenzyl)Androstan-3β-Ol-17-One*

A ten gram portion of the crude hydrogenation product of 16-(4-methoxybenzylidene)androstan-3β-ol-17-one was subjected to column chromatography on silica. Elution with 60% ether in n-pentane and repeated recrystallization from aqueous methanol gave a sample of 16β-(4-methoxybenzyl)androstan-3β-ol-17-one melting at 155–162° C. (uncorr.) which showed some signs of solvation despite careful drying. The rotation was $[\alpha]_D^{25}=+91.0°$.

Acetylation of a small portion with acetic anhydride and pyridine gave 3β-acetoxy-16β-(4-methoxybenzyl)androstan-17-one, identical with the compound prepared in Example 22.

*(c) 3β,17β-Diacetoxy-16β-(4-Methoxybenzyl)Androstane*

A solution of 35.55 g. (86 mmoles) of 16β-(4-methoxybenzyl)androstane-3β,17β-diol (part *a*) in 50 ml. of pyridine and 50 ml. of acetic anhydride was heated to 100° C. for 30 minutes and after cooling to room temperature was diluted with 2.5 liters of cold water. The diacetate precipitated as a gum which crystallized. The slightly sticky solid was broken up, collected by suction filtration, and washed well with water. Recrystallization of the damp crude produce from methanol gave 31.0 g. of solid, M.P. 80–100° C. Recrystallization was best effected from a mixture of ethyl acetate and n-hexane. By exhaustive drying of recrystallized material in vacuo at 80° C. for 24 hours solvent-free 3β,17β-diacetoxy-16β-(4-methoxybenzyl)androstane was obtained.

EXAMPLE 25

*3β,17β-Diacetoxy-16β-(4-Oxocyclohexylmethyl) Androstane*

A. *Birch reduction.*—To a solution of 96.5 g. of 3β,17β-diacetoxy-16β - (4 - methoxybenzyl)androstane (Example 24c) in a mixture of 1050 ml. of anhydrous ether and 2750 ml. of freshly dried tetrahydrofuran was added 8.5 liters of anhydrous liquid ammonia. The solution was stirred mechanically in a 22 liter flask fitted with a condenser cooled with solid carbon dioxide, while 40 g. of lithium wire was added in short pieces during 15 minutes. The blue-black solution was stirred for one-half hour after the lithium had been added. Absolute ethanol was next added in a slow stream from a dropping funnel at the maximum rate permitted by flooding of the condenser due to the exothermic reaction. After 17 minutes the solution had become decolorized, by which time 500 ml. of ethanol had been added. The condenser was removed and the ammonia was evaporated by heating the vigorously stirred solution on a steam bath. After the ammonia had been driven off, heat was applied more cautiously to evaporate the ether without heating the solution above 40° C. The residual tetrahydrofuran solution was then diluted with 10 liters of cold water. An organic layer formed and was separated from the aqueous phase, and the latter was then extracted with three portions of methylene dichloride totalling 4500 ml. The solution formed by combining the extracts with the organic phase was dried over solid potassium carbonate for 30 hours.

B. *Re-acetylation.*—After filtration to remove the drying agent, the methylene dichloride solution was distilled to dryness under reduced pressure. The residue was dissolved in 250 ml. of pyridine and 100 ml. of acetic anhydride. After 48 hours at room temperature, the solution was poured as a slow stream into six liters of cold water, and the product precipitated as a gummy mass from which the aqueous phase was easily decanted. The gummy product was dissolved in acetone (800 ml.) and reprecipitated by dilution with water as before. The solid product was collected by suction filtration and washed with water.

C. *Hydrolysis.*—Without further purification, the crude dihydroenol ether was dissolved in 1000 ml. of tetrahydrofuran and 1000 ml. of methanol, and a solution of 90 g. of oxalic acid dihydrate was added. The solution was left to stand for one hour at 30° C., and then was diluted with 3 liters of ether. The solution was washed with dilute sodium bicarbonate solution until it was free of acid, then twice with 500 ml. portions of water, and finally with 500 ml. of saturated sodium chloride. The combined aqueous washes were back-extracted with 500 ml. of ether, the extract was washed in turn with bicarbonate, water, and sodium chloride and then combined with the main ether solution. The ether solution was dried overnight over anhydrous sodium sulfate and distilled to dryness under reduced pressure.

D. *Catalytic reduction.*—The oily unsaturated ketone was dissolved in sufficient ethyl acetate to make 600 ml. of solution. Six grams of 10% palladium on carbon was added, and the mixture was agitated at room temperature under a pressure of four atmospheres of hydrogen. Reduction proceeded slowly and uptake of hydrogen ceased only after agitation had been conducted for 20 hours. In that time, the solution had absorbed 99 millimoles of hydrogen or 51% of theory, based upon the starting 16β-(4-methoxybenzyl) compound. The hydrogenated mixture was filtered to remove the catalyst, which was washed with several small portions of ethyl acetate. The combined filtrate and washings were concentrated by distillation under reduced pressure, affording 46.2 g. of crystalline 3β,17β - diacetoxy - 16β - (4-oxocyclohexylmethyl)-androstane, M.P. 178–182° C. (uncorr.). Evaporation of the filtrate gave an oily residue which was subjected to column chromatography on 750 g. of silica. Elution with 20% ether in n-pentane gave 3.15 g. of 16β-(4-methoxybenzyl) starting material. Elution with 40% and 50% ether in n-pentane gave the only other solid obtained from the chromatogram, and after one recrystallization from n-hexane containing 10% acetone there was obtained 8.80 g. of additional saturated ketone, M.P. 181–182.5° C. A sample of 3β,17β-diacetoxy-16β-(4-oxocyclohexylmethyl)androstane obtained by several recrystallizations from n-hexane had M.P. 182.8–183.8° C. (corr.), $[\alpha]_D^{25}=+16.3°$. The ultraviolet spectrum showed only meager absorption, $\lambda_{max}$ 280–290 mμ (ε 20) characteristic of saturated six-membered ring ketones. The infrared spectrum was entirely consistent with the structure depicted; the major features were strong ester carbonyl absorption at 5.77μ and a band at 5.82μ for the saturated ketone.

EXAMPLE 26

*3β,17β-Diacetoxy-16β-(4-Oximinocyclohexylmethyl)-Androstane*

A solution of 4.9 g. of 3β,17β-diacetoxy-16β-(4-oxocyclohexylmethyl)androstane (Example 25) and 1.04 g. of hydroxylamine hydrochloride in 50 ml. of absolute ethanol plus 15 ml. of pyridine was heated at reflux for two hours. The solution was cooled to room temperature and poured into 600 ml. of a mixture of ice and water. After one-half hour at room temperature, the mixture was filtered, and the collected solid was dried and recrystallized three times from a mixture of acetone and n-hexane to give 3β,17β-diacetoxy-16β-(4-oximinocyclohexylmethyl)androstane, M.P. 186.6–187.8° C. (corr.), $[\alpha]_D^{25}=+7.8°$. In the infrared, there appeared a sharp unbonded hydroxyl band at 2.87μ and a sharp, strong acetate-carbonyl band at 5.78μ. Other features in the infrared were consistent with the oxime structure, including weak absorption at 6.04μ for the >C=N— double bond.

EXAMPLE 27

*3β,17β - Diacetoxy-16β-(4-Aza-5-Oxocycloheptylmethyl)-Androstane*

A solution of 5.0 g. of 3β,17β-diacetoxy-16β-(4-oximinocyclohexylmethyl)androstane in 150 ml. of p-dioxane was heated to 50° C. External heating was discontinued and the solution was stirred while 6.0 g. of thionyl chloride was added in several small portions over a period of seven minutes. The temperature was maintained at 50–55° C. by external heating for 15 minutes, after which the solution was cooled to room temperature. Saturated aqueous sodium bicarbonate solution (150 ml.) was added cautiously, and the resulting mixture was stirred vigorously at room temperature for 15 minutes. The mixture was next diluted with 2 liters of cold water and left to stand at room temperature for 12 hours. The product was collected by filtration, washed with water and dried in air. The crude amorphous product (5.2 g.) did not crystallize well, and was therefore purified initially by column chromatography on Florisil (activated magnesium silicate). Elution of the column with increasing proportions of acetone in ether afforded only one solid product, which was eluted with 30% acetone in ether. Recrystallization from a mixture of acetone and n-hexane gave 3β,17β-diacetoxy-16β-(4-aza-5-oxocycloheptylmethyl)androstane, M.P. 170.2–174.2° C. (corr.), $$[\alpha]_D^{25}=+19.3°$$

The infrared spectrum was consistent with the lactam structure.

3β,17β-diacetoxy - 16β - (4-aza-5-oxocycloheptylmethyl)androstane was found to exhibit myotrophic activity when administered subcutaneously to male rats at a dose level of 11.2 mg./kg. per day.

EXAMPLE 28

*16β-(4-Azacycloheptylmethyl)Androstane-3β,17β-Diol*

A solution of 4.80 g. of 3β,17β-diacetoxy-16β-(4-aza-5-oxycycloheptylmethyl)androstane in 250 ml. of dry tetrahydrofuran was added in a slow stream at room temperature to a stirred mixture of 3.80 g. of lithium aluminum hydride in 250 ml. of tetrahydrofuran. The mixture was stirred for one hour and then heated under reflux for eight hours. Water (7.6 ml.) was added dropwise to the cooled mixture, and stirring was continued for 15 minutes at room temperature. The reaction mixture was filtered and the filter cake was washed with several small portions of tetrahydrofuran, which were combined with the filtrate. Evaporation of the filtrate under reduced pressure afforded a clear semicrystalline residue which was dissolved in 40 ml. of dry methanol. The addition of 1.0 ml. of ethanolic hydrogen chloride solution (9.8 N) caused precipitation of the hydrochloride: 2.94 g., M.P. over 320° C. A second crop of crystals (100 mg.) was obtained from the filtrate. One recrystallization of the combined material from a mixture of methanol and ethanol gave 16β-(4-azacycloheptylmethyl)androstane-3β,17β-diol in the form of its hydrochloride salt hemihydrate, $[\alpha]_D^{25}=+15.4°$ (0.5% in methanol). The infrared spectrum was in agreement with the assigned structure.

EXAMPLE 29

*16-(1-Methyl-2-Piperidylmethyl)Androstan-3β-Ol-17-One*

A solution of 9.53 g. of 16β-(2-pyridylmethyl)androstan-3β-ol-17-one methobromide (Example 20, Part b) in 300 ml. of 95% ethanol was hydrogenated in the presence of 0.5 g. of platinum oxide catalyst. After three moles of hydrogen had been absorbed, the catalyst was removed by filtration and the filtrate concentrated to dryness. The residue was dissolved in methanol, the solution cooled, a little isopropyl alcohol added and the product allowed to crystallize. The solid (4.31 g.) was collected, recrystallized twice from ethanol, and dried at 140° C. in vacuo over phosphorus pentoxide for twenty-four hours to give 16β-(1-methyl-2-piperidylmethyl)androstan-3β-ol-17-one in the form of its hydrobromide salt, M.P. 283.2–284.6° C. (corr.), $[\alpha]_D^{25}=+66.4°$.

Similarly, the methobromide salt of 16β-(1-methyl-4-piperidylmethyl)androstan-3β-ol-17-one (Example 21) can be hydrogenated to give 16β-(1-methyl-4-piperidylmethyl)androstan-3β-ol-17-one.

We claim:
1. A compound selected from the group consisting of

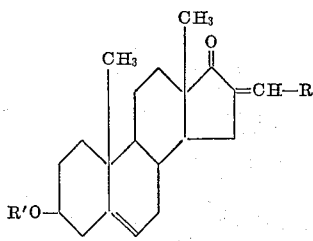

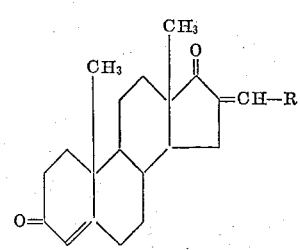

and

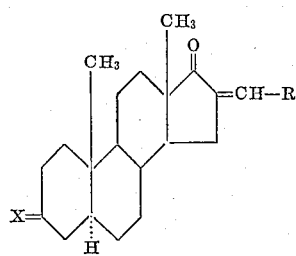

wherein R is a member of the group consisting of pyridyl, thienyl, furyl, phenylvinyl and phenyl substituted by from one to three substituents selected from the group consisting of halogen, di-lower-alkylamino, lower-alkoxy and benzyloxy; R' is a member of the group consisting of hydrogen and Acyl; and X is a member of the group consisting of O, (H)(OH) and (H)(OAcyl); Acyl in each instance being a carboxylic acid acyl group having from one to ten carbon atoms and a molecular weight less than 200; and acid-addition and quaternary ammonium salts of basic members thereof.

2. A compound of the formula

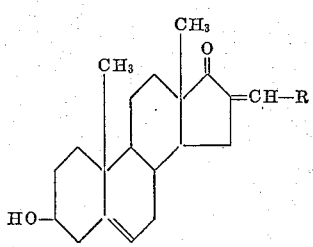

wherein R is phenyl substitued by from one to three halogen atoms.

3. A compound of the formula

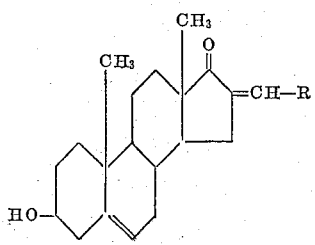

wherein R is pyridyl

4. A compound of the formula

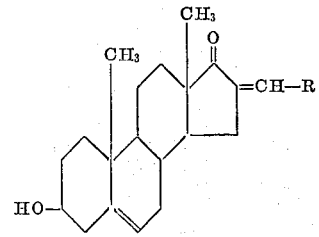

wherein R is phenyl substituted by from one to three lower-alkoxy groups.

5. A compound of the formula

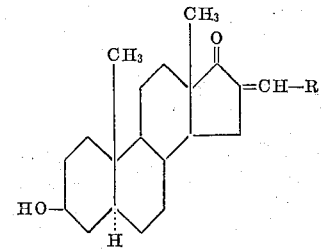

wherein R is pyridyl.

6. 16 - (4 - dimethylaminobenzylidene) - 5 - androsten-3β-ol-17-one.
7. 16-cinnamylidene-5-androsten-3β-ol-17-one.
8. 16 - (4 - methoxybenzylidene) - 4 - androstene - 3,17-dione.
9. 16-(4-methoxybenzylidene)androstan-3β-ol-17-one.
10. 16 - (4 - dimethylaminobenzylidene)androstan - 3β-ol-17-one.
11. 16 - (4 - benzyloxybenzylidene)androstan - 3β - ol-17-one.
12. 16-(4-hydroxybenzylidene)-2-androsten-17-one.
13. A compound selected from the group consisting of those having the formula

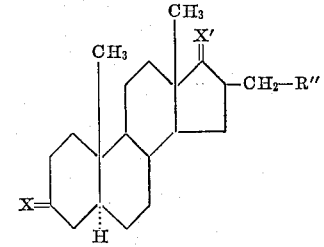

wherein R'' is a member of the group consisting of pyridyl, thienyl, furyl, 1-lower-alkylpiperidyl, 4-oxocyclohexyl, 4-oximinocyclohexyl, 4-azacycloheptyl, 4-aza-5-oxocycloheptyl, and phenyl substituted by from one to three substituents selected from the group consisting of halogen, di-lower-alkylamino and lower-alkoxy; and X and X' are members of the group consisting of O, (H)(OH) and (H)(OAcyl), Acyl being a carboxylic acyl group having from one to ten carbon atoms and a molecular weight less than about 200; and acid-addition and quaternary ammonium salts of basic members thereof.

14. A compound of the formula

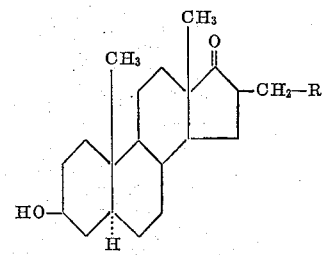

wherein R'' is pyridyl.
15. 16β-(4-methoxybenzyl)androstane-3β,17β-diol.

16. 3β,17β - diacetoxy - 16β - (4 - oxocyclohexylmethyl)androstane.

17. 3β,17β - diacetoxy - 16β - (4 - aza - 5 - oxocycloheptylmethyl)androstane.

18. 16β - (4 - azacycloheptylmethyl)androstane - 3β, 17β-diol.

19. 16β - (1 - methyl - 2 - piperidylmethyl)androstan-3β-ol-17-one.

References Cited in the file of this patent

UNITED STATES PATENTS 2,588,391    Julian et al.  ---------- Mar. 11, 1952

OTHER REFERENCES

Clinton et al.: "J. Org. Chem.," Vol. 27, No. 4, April 1962, pp. 1148–1154.